United States Patent [19]

Tanimura et al.

[11] Patent Number: 5,029,465
[45] Date of Patent: Jul. 9, 1991

[54] VORTEX FLOWMETER

[75] Inventors: Yoshihiko Tanimura, Tokyo; Hisato Azuma, Hyogo; Hisato Ishiguro, Hyogo; Yasuo Tada, Hyogo, all of Japan

[73] Assignee: Mitsubishi Jidosha Kogyo Kabushiki Kaisha and Mitsubishi Denki Kabushiki Kaisha, Tokyo, Japan

[21] Appl. No.: 514,443

[22] Filed: Apr. 25, 1990

[30] Foreign Application Priority Data

Apr. 25, 1989 [JP] Japan ................................ 1-106656
May 23, 1989 [JP] Japan ................................ 1-129333

[51] Int. Cl.[5] ............................................. G01F 1/32
[52] U.S. Cl. ............................... 73/118.2; 73/861.22
[58] Field of Search ............ 73/118.2, 861.22, 861.23; 123/494

[56] References Cited

U.S. PATENT DOCUMENTS

| 3,874,234 | 4/1975 | Burgess | 73/861.22 |
| 4,375,204 | 3/1983 | Yamamoto | 73/118.2 |
| 4,446,824 | 5/1984 | Endo et al. | 73/118.2 |
| 4,452,089 | 6/1984 | Wada | 73/861.23 |
| 4,759,213 | 7/1988 | Porth | 73/118.2 |

FOREIGN PATENT DOCUMENTS

| 55-31979 | 5/1980 | Japan . |
| 55-31980 | 5/1980 | Japan . |
| 55-35253 | 5/1980 | Japan . |
| 0103368 | 8/1981 | Japan | 73/861.22 |
| 58-21517 | 8/1983 | Japan . |
| 62-26686 | 7/1987 | Japan . |
| 180819 | 12/1988 | Japan . |
| 1511591 | 5/1978 | United Kingdom . |

Primary Examiner—Herbert Goldstein
Attorney, Agent, or Firm—Sughrue, Mion, Zinn, Macpeak and Seas

[57] ABSTRACT

A vortex flowmeter including a shell member having an inlet and an outlet which are opened in the side wall thereof, a filter element provided in the shell member to define two, upper and lower, chambers inside the shell member and also isolate the inlet and the outlet from each other, a duct connected to the shell member in such a manner as to communicate with the outlet, and a vortex generating device provided inside the duct. A tubular projection is provided at the outlet in such a manner as to extend into the shell member, the projection being tapered toward the outlet, thereby correcting the flow of air flowing into the outlet so that the velocity distribution of air streams inside the duct becomes uniform.

3 Claims, 5 Drawing Sheets

Fig.2 PRIOR ART
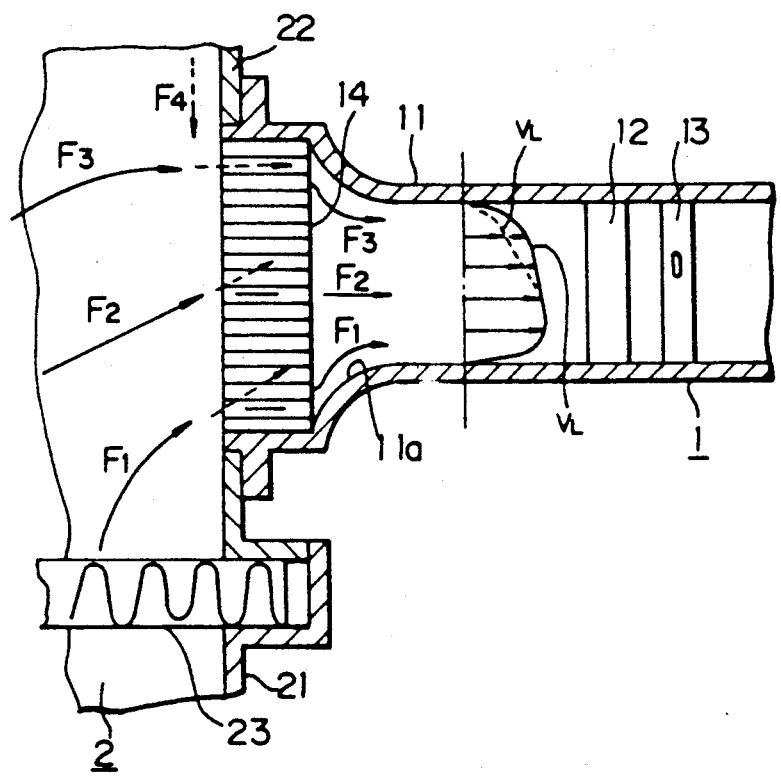
Fig.3 PRIOR ART (a) Vc
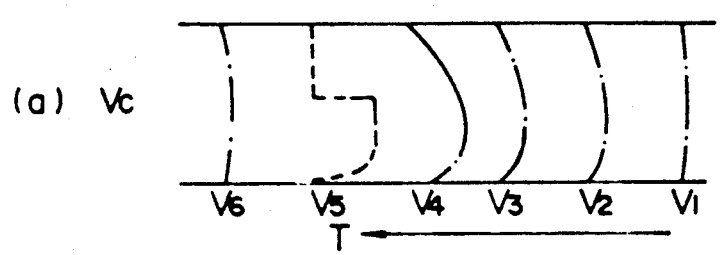
Fig.3 PRIOR ART (b) Vo
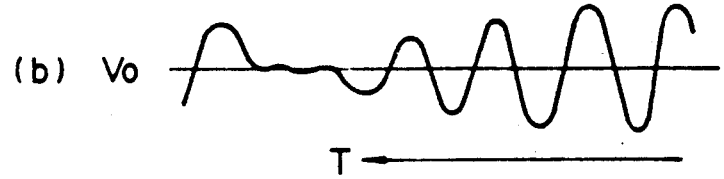

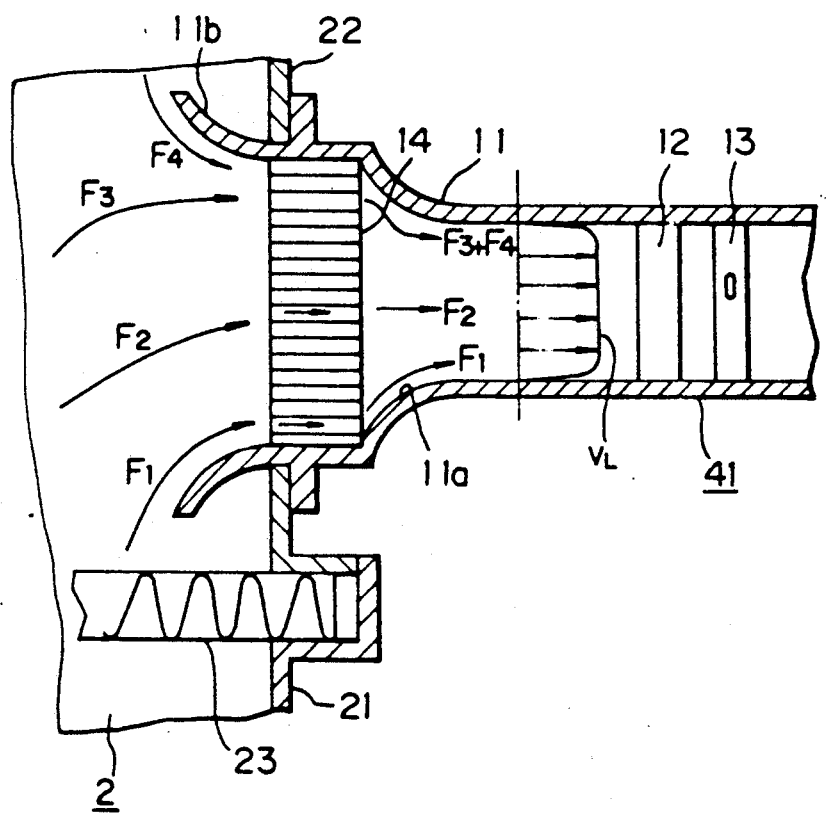
Fig.4
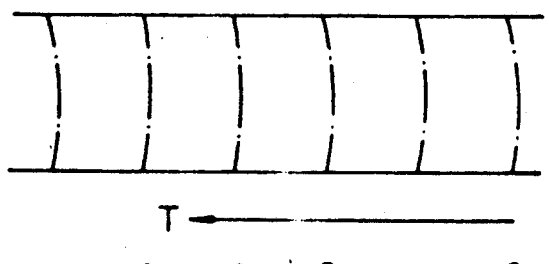
Fig.5 (a) $V_c$
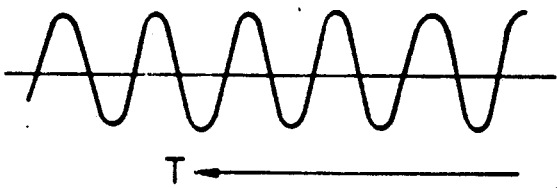
Fig.5 (b) $V_o$

VORTEX FLOWMETER

BACKGROUND OF THE INVENTION

1. Field of the Invention

The present invention relates to a vortex flowmeter and, more particularly, to a vortex flowmeter for use in an internal combustion engine.

2. Description of the Related Art

In general, when a vortex flowmeter is employed in an internal combustion engine, it is always provided at the downstream side of an air cleaner provided to remove dust from air sucked into the engine, as shown, for example, in Japanese Patent Publication No. 62-26686 and Japanese Patent Public Disclosure No. 58-21517.

Incidentally, if the flow of a fluid which is to be measured is not stable, measuring accuracy thereof will be lowered and in some cases measurement may not be possible at all. Since a vortex flowmeter employed in an internal combustion engine is provided at the downstream side of an air cleaner, as described above, it is in many cases impossible to ensure sufficient space for a fluid to flow with the required level of stability and consequently drift and turbulent flows increase considerably when the flow rate is high. If a known straightening mechanism is employed in such an arrangement, generation of vortices may be obstructed.

FIG. 1 is a sectional view of a conventional vortex flowmeter 1 which is provided at the downstream side of an air cleaner of an engine. The vortex flowmeter 1 comprises a duct 11 having a quadrilateral cross-sectional configuration for passing a fluid which is to be measured, a first vortex generating column 12 provided inside the duct 11 to generate a Karman vortex, a second vortex generating column 13 provided inside the duct 11 at the downstream side of the first vortex generating column 12 to generate a Karman vortex, the second vortex generating column 13 having a vortex detecting pressure introducing port, a honeycomb straightening 14 provided at the upstream end of the duct 11, and a control circuit 15 provided outside the duct 11. An air cleaner 2 comprises an upstream cover 21 having a fluid inlet, a downstream cover 22 having a fluid outlet which is connected to the duct 11, and a dust removing element 23 provided between the upstream cover 21 and the downstream cover 22. An intake pipe 3 is connected to the downstream end of the duct 11 to lead a fluid to the engine through a throttle valve (not shown).

In the above-described arrangement, a fluid which is to be measured, that is, air, flows into the upstream cover 21 of the air cleaner 2, as shown by the streamline $F_{IN}$, and then flows inside the downstream cover 22, as shown by the streamlines $F_1$ to $F_4$, to reach the inlet of the vortex flowmeter 1. Since the fluid tends to flow through a region where the resistance is relatively low, in general the air flow along the streamline $F_2$ has the highest flow velocity, those along the streamlines $F_1$ and $F_3$ follow it, and the air flow along the streamline $F_4$ has the lowest flow velocity. The velocity of the air flow along the streamline $F_4$ is extremely unstable. The fluid reaching the inlet of the vortex flowmeter 1 flows into the intake pipe 3 along the streamline $F_{OUT}$.

The following is a description of the flow velocity distribution in the vortex flowmeter 1 of the fluid streams flowing along the streamlines $F_1$ to $F_4$ in the air cleaner 2. FIG. 2 is an enlarged sectional view showing the outlet side of the air cleaner 2 and the upstream side of the vortex flowmeter 1. Reference numeral 11a in the figure denotes a bell mouth portion which is provided along the entire circumference of the inlet of the duct 11, the bell mouth portion 11a being disposed at the downstream side of the honeycomb straightening device 14. Accordingly, after reaching the honeycomb straightening device 14, the fluid streams flowing along the streamlines $F_1$ to $F_4$, which would otherwise flow in the respective directions shown by the chain lines, are straightened by the honeycomb straightening device 14 so as to flow in the respective directions shown by the solid lines. Then, the fluid streams along the streamlines $F_1$ and $F_3$ are accelerated in the bell mouth portion 11a so that the flow velocities of these fluid streams approach that of the fluid stream along the streamline $F_2$ that has the highest flow velocity. Accordingly, if it is assumed that there is no fluid stream along the streamline $F_4$, the flow velocity distribution inside the duct 11 immediately in front of the first vortex generating column 12 is relatively uniform, as shown by the solid line $V_L$. In actuality, however, there is a fluid stream flowing along the streamline $F_4$, and the fluid stream along the streamline $F_3$ is therefore forced to shift downwardly by the fluid stream along the streamline $F_4$, resulting in a reduction in the flow velocity of this fluid stream in the vicinity of the bell mouth portion 11a. Thus, the flow velocity distribution is distorted, as shown by the chain line $V_L'$. A vortex that is generated when the flow velocity distribution is distorted as described above varies in intensity and sometimes disappears. Such a vortex condition is shown in FIG. 3. $V_C$ shown in FIG. 3(a) denotes the center of a vortex column generated in the duct 11, that is, the position of the vortex line. $V_O$ shown in FIG. 3(b) denotes the intensity of the vortex, that is, the vortex pressure. It is assumed that six vortices $V_1$ to $V_6$ are successively generated while the time T elapses from the right to the left as viewed in the figure. In the vortex $V_1$, the distortion of the vortex line is not yet large. However, as the vortices $V_2$ to $V_4$ are succesively generated, the degree of distortion increases, and the vortex line finally breaks in the vortex $V_5$. In the meantime, the vortex intensity $V_O$ gradually decreases and reaches zero at the time of generation of the vortex $V_5$ in which the vortex line breaks. More specifically, there is practically no vortex $V_5$. After the vortex line has broken, a vortex $V_6$ having a relatively low vortex intensity $V_O$ is generated, and the vortex intensity $V_O$ gradually increases thereafter. However, the vortex disappears again after the vortices $V_1$ to $V_4$ have been successively generated.

Thus, the conventional vortex flowmeter suffers from the following problems. The vortex disappears periodically, and the accuracy of the measurement is substantially lowered in the case of a fluid which is likely to cause many drift and turbulent flows, with the end result that the vortex flowmeter fails to serve its purpose.

SUMMARY OF THE INVENTION

It is an object of the present invention to provide a vortex flowmeter which is designed so that, even if a fluid which is to be measured is likely to cause many drift and turbulent flows, the flow of the fluid is stabilized so as to enable accurate and stable measurement of the flow rate.

3

To this end, the present invention provides a vortex flowmeter including a shell member having an inlet and an outlet which are opened in the side wall thereof, a filter element provided in the shell member to define two, upper and lower, chambers inside the shell member and also isolate the inlet and the outlet from each other, a duct connected to the shell member in such a manner as to communicate with the outlet, and a vortex generating device provided inside the duct, wherein the improvement comprises a tubular projection provided at the outlet in such a manner as to extend into the shell member, the projection being tapered toward the outlet, thereby correcting the flow of air flowing into the outlet so that the velocity distribution of air streams inside the duct becomes uniform.

The projection that is provided in the present invention functions to make the flow velocity of a drift closer to the flow velocity of the center flow and also to straighten a drift or a turbulent flow, thereby increasing the velocity of a normal flow.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and of which:

FIG. 2 is an enlarged sectional view of an essential part of the arrangement shown in FIG. 1;

FIGS. 3(a) and 3(b) show the way in which vortices are generated in the conventional vortex flowmeter;

FIG. 4 is a sectional view of one embodiment of the vortex flowmeter according to the present invention which is connected to an air cleaner of an internal combustion engine;

FIGS. 5(a) and 5(b) show the way in which vortices are generated in the vortex flowmeter according to the present invention;

DETAILED DESCRIPTION OF THE PREFERRED EMBODIMENTS

Figure 1:
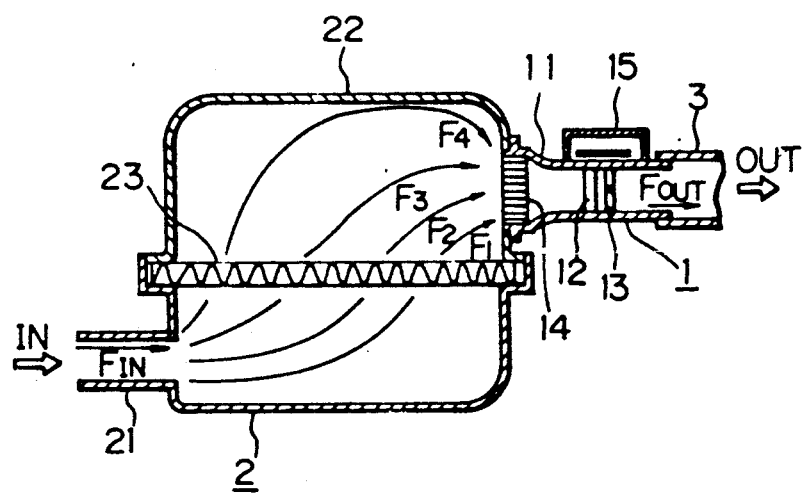
FIG. 1 is a sectional view of a conventional vortex flowmeter which is connected to an air cleaner of an internal combustion engine.

One embodiment of the present invention will be described below in detail with reference to FIGS. 4 and 5. FIG. 4 is a sectional view of a vortex flowmeter 41 according to this embodiment, the vortex flowmeter 41 being connected between an air cleaner 2 and an intake pipe 3 of an internal combustion engine. Reference numeral $11b$ denotes a funnel portion of a duct 11. The funnel portion $11b$ has a quadrilateral cross-sectional configuration and projects upstream of a honeycomb straightening device 14, that is, it extends into the air cleaner 2. The funnel portion $11b$ is provided over the entire circumference of the inlet of the duct 11 in the same way as in the case of the bell mouth portion $11a$.

4

The arrangement of the rest of the vortex flowmeter 41 is the same as that of the conventional vortex flowmeter 1 shown in FIG. 1.

In the above-described arrangement, a fluid which is to be measured flows through the air cleaner 2 in the same way as in the prior art and reaches the funnel portion $11b$ of the duct 11. Among the fluid streams, those flowing along the streamlines $F_1$ to $F_3$ pass through the funnel portion $11b$ to reach the honeycomb straightening device 14 where the fluid flow is straightened, and the fluid streams then pass through the bell mouth portion $11a$. In this course, the fluid stream along the streamline $F_1$ is throttled and consequently the flow velocity of this fluid stream immediately in front of the honeycomb straightening device 14 becomes closer to that of the fluid stream along the streamline $F_2$ than in the case of the prior art. The fluid stream along the streamline $F_4$, which forces the fluid stream along the streamline $F_3$ to shift downwardly in the prior art, is directed so as to flow in a direction in which it increases the velocity of the fluid stream along the streamline $F_3$ by the throttling function of the funnel portion $11b$. As a result, the flow velocity distribution $V_L$ inside the duct 11 immediately in front of the first vortex generating column 12 becomes uniform. In consequence, the vortex line position $V_C$ and the vortex intensity $V_O$ are kept extremely stable as the time T elapses and vortices are therefore generated under normal conditions, as shown in FIGS. 5(a) and 5(b), resulting in an increase in the accuracy of the measurement. Since the funnel portion $11b$ is provided along the entire circumference of the inlet of the duct 11, the flow velocity distribution which is perpendicular to the first vortex generating column 12 is also made uniform, so that the generation of vortices is even more stablized. It should be noted that the drawing rate of the funnel portion $11b$, that is, the dimensional ratio of the inlet to the outlet of the funnel portion $11b$ is preferably set at from 1.1:1 to 1.5:1 in the direction parallel to the vortex generating column 12 and at from 1.2:1 to 1.5:1 in the direction perpendicular to it with a view to obtaining a vortex flowmeter having superior stability.

Figure 6:
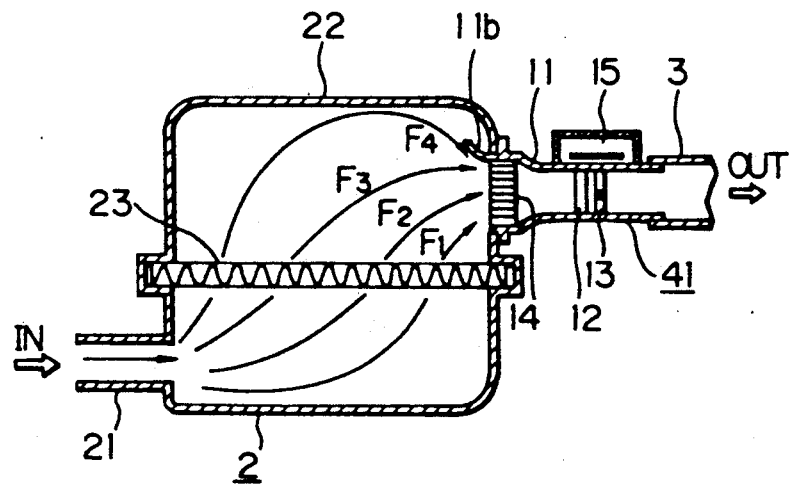
FIGS. 6 and 7 are a sectional view and a fragmentary enlarged sectional view of another embodiment of the vortex flowmeter according to the present invention which is connected to an air cleaner of an internal combustion engine.
Figure 7:
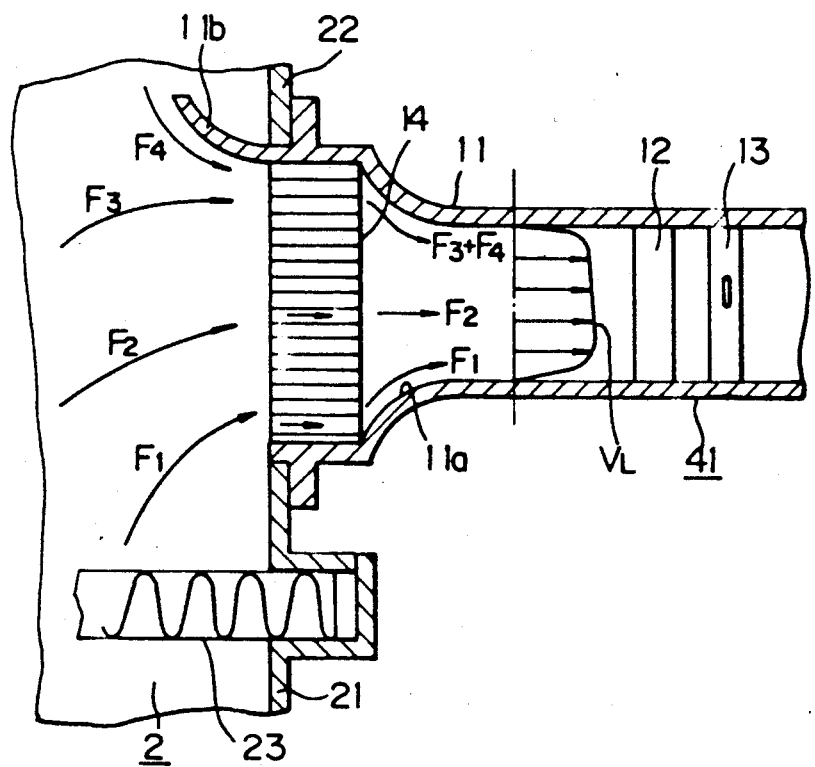

FIG. 6 is a sectional view of a vortex flowmeter 41 according to another embodiment of the present invention, which is connected between an air cleaner 2 and an intake pipe 3 of an internal combustion engine, and FIG. 7 is an enlarged sectional view showing an essential part of the arrangement shown in FIG. 6. Reference numeral $11b$ denotes a funnel portion $11b$ of the duct 11 which projects upstream of the honeycomb straightening device 14, that is, extends into the air cleaner 2. The funnel portion $11b$ is provided only on that portion of the duct 11 which faces the side of the downstream cover 22 that is remote from the dust removing element 23. The funnel portion $11b$ has such a confuguration that a fluid which is to be measured is throttled toward the inlet of the duct 11. The arrangement of the rest of this embodiment is the same as that of the first embodiment stated above.

In the above-described arrangement, a fluid which is to be measured flows through the air cleaner 2 to reach the inlet of the duct 11, that is, the honeycomb straightening device 14, in the same way as in the prior art. Among the fluid streams, those flowing along the streamlines $F_1$ to $F_3$ are straightened by the honeycomb straightening device 14 and then pass through the bell mouth portion $11a$. In this course, the fluid stream along the streamline $F_4$, which forces the fluid stream along the streamline $F_3$ to shift downwardly in the prior art, is directed so as to flow in a direction in which the velocity of the fluid stream along the streamline $F_3$ is increased by the throttling function of the funnel portion 11b. As a result, the flow velocity distribution $V_L$ inside the duct 11 immediately in front of the first vortex generating column 12 becomes uniform, and vortices are therefore generated under normal conditions, resulting in an increase in the accuracy of the measurement.

Figure 8:
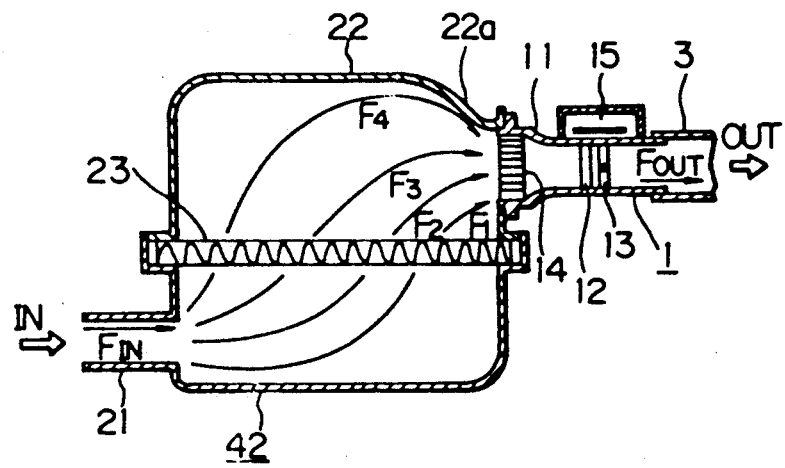
FIGS. 8 and 9 are a sectional view and a fragmentary enlarged sectional view of still another embodiment of the vortex flowmeter according to the present invention which is connected to an air cleaner of an internal combustion engine.
Figure 9:
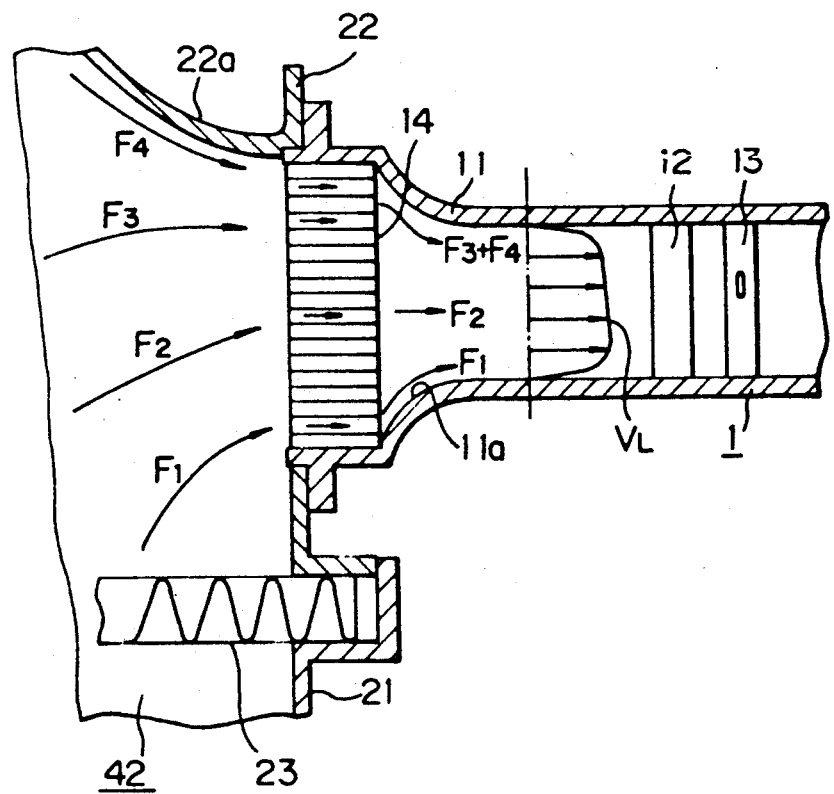

FIGS. 8 and 9 are a sectional view and a fragmentary enlarged sectional view of still another embodiment of the present invention. Reference numeral 22a denotes a throttle portion formed by shaping into a throttle-like configuration that portion of the downstream cover 22 of the air cleaner 42 which is remote from the dust removing element 23 and which is connected to the duct 11. The arrangement of the rest of this embodiment is the same as that of the foregoing embodiments.

In the above-described arrangement, the fluid streams along the streamlines $F_1$ to $F_3$ flow in the same way as in the prior art. However, the fluid stream along the streamline $F_4$ is directed by the throttle portion 22a so as to flow along the streamline $F_3$, thus increasing the velocity of the fluid stream along the streamline $F_3$. As a result, the flow velocity distribution $V_L$ inside the duct 11 immediately in front of the first vortex generating column 12 becomes uniform, and vortices are therefore generated under normal conditions, resulting in an increase in the accuracy of the measurement.

Although the present invention has been described through specific terms, it should be noted here that the described embodiments are not necessarily exclusive and that various changes and modifications may be imparted thereto without departing from the scope of the invention which is limited solely by the appended claims.

What is claimed is:

1. In a vortex flowmeter arrangement for an internal combustion engine, including an air cleaner (2) defined by an upper, cup-shaped cover (22) and a lower, cup-shaped cover (21), a filter element (23) disposed between open sides of the upper and lower covers to divide the air cleaner into upper and lower chambers, an air inlet defined in a side wall of the lower cover, an air outlet defined in a side wall of the upper cover, opposite the air inlet, such that an asymmetrical air flow velocity distribution prevails at an inlet zone of the air outlet, an elongate flowmeter duct (11) having an outwardly flared bell mouth inlet (11a) coupled to said air outlet, and vortex generating means disposed inside the duct, the improvement characterized by: means for correcting the air flow velocity to a substantially uniform or symmetrical distribution at the inlet zone of the air outlet, said correcting means comprising a tubular projection (11b) extending from the air outlet into the upper chamber, said projection having a concave taper in a direction toward the air outlet to define an outwardly flared air intake mouth.

2. A vortex flowmeter according to claim 1, wherein said projection only partially surrounds said air outlet, and extends towards a base of the upper cover whereat the air flow velocity is lowest.

3. In a vortex flowmeter arrangement for an internal combustion engine, including an air cleaner (2) defined by an upper, cup-shaped cover (22) and a lower, cup-shaped cover (21), a filter element (23) disposed between open sides of the upper and lower covers to divide the air cleaner into upper and lower chambers, an air inlet defined in a side wall of the lower cover, an air outlet defined in a side wall of the upper cover, opposite the air inlet, such that an asymmetrical air flow velocity distribution prevails at an inlet zone of the air outlet, an elongate flowmeter duct (11) having an outwardly flared bell mouth inlet (11a) coupled to said air outlet, and vortex generating means disposed inside the duct, the improvement characterized by:

means for correcting the air flow velocity to a substantially uniform or symmetrical distribution at the inlet zone of the air outlet, said correcting means comprising a base portion (22a) of the upper cover merging smoothly with an upper edge of the air outlet, and defining a concave, outwardly flared air intake guide.

* * * * *